(12) United States Patent
Tung et al.

(10) Patent No.: US 6,569,346 B1
(45) Date of Patent: May 27, 2003

(54) FERRITE WITH HIGH PERMEABILITY AND HIGH DIELECTRIC CONSTANT AND METHOD FOR MAKING THE SAME

(75) Inventors: Mean-Jue Tung, Hsinchu (TW); Yu-Ting Huang, Hsinchu (TW); Yen-Ping Wang, Taoyuan Hsien (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 10/029,236

(22) Filed: Dec. 28, 2001

(51) Int. Cl.$^7$ ............... C04B 35/64; C04B 35/26; H01E 1/00
(52) U.S. Cl. ............... 252/62.56; 252/62.59; 252/62.6; 252/62.61; 252/62.62; 252/62.64
(58) Field of Search ............... 252/62.56, 62.59, 252/62.6, 62.61, 62.62, 62.64

(56) References Cited

U.S. PATENT DOCUMENTS

| | | |
|---|---|---|
| 5,029,043 A | 7/1991 | Kitahara et al. |
| 5,512,196 A * | 4/1996 | Mantese et al. ........... 252/62.6 |
| 5,856,770 A | 1/1999 | Mantese et al. |

FOREIGN PATENT DOCUMENTS

JP 62-147703 U 9/1987

\* cited by examiner

*Primary Examiner*—Elizabeth D. Wood
(74) *Attorney, Agent, or Firm*—Birch, Stewart, Kolasch & Birch, LLP

(57) ABSTRACT

A ferrite with a high permeability and a high dielectric constant is introduced. Raw material powders, such as $TiO_2$, $Fe_2O_3$ and the oxide of Mn, Ni, Cu, Mg, Li or Zn is prepared and combined in the proportion $Ti_x(MFe_2O_{4+2x/y})_y$, where $x+y=1$ and $0<x<1$. M is any one of a mixture of metals selected from Mn, Ni, Cu, and Zn. The ratio between x and y can be adjusted according to practical needs to obtain ferrites with different permeabilities and dielectric constants. The ferrite can simultaneously be a magnetic material and a dielectric material in an electronic element. This can avoid the possible drawbacks due to sintering of two different materials in the prior art.

7 Claims, 4 Drawing Sheets

FERRITE WITH HIGH PERMEABILITY AND HIGH DIELECTRIC CONSTANT AND METHOD FOR MAKING THE SAME

BACKGROUND OF THE INVENTION

1. Field of Invention

The invention relates to a ceramic material with both high permeability and high dielectric constant. More particularly, it relates to a ferrite with both high permeability and high dielectric constant and the manufacturing method for the same.

2. Related Art

Generally speaking, dielectric materials and ferrite materials are two kinds of substances with different properties and functions. The ferrite is a ferrimagnetic material, which, according to most studies, has a dielectric constant under 20. The dielectric materials, such as those used in capacitors, are not magnetic; that is, their permeabilities all equal 1. Therefore, if a layered element needs materials with both high permeability and high dielectric constant, e.g. LC-type layered elements or LC compound elements, different magnetic material and dielectric material are often needed to be sintered together. However, sintering two different materials usually causes many problems such as material compatibility, material match and breakdown of finished products. To conquer the problems due to sintering two different materials, one resolution is to find a material with both high permeability and high dielectric constant. In the prior art, the methods of obtaining materials with both high permeability and high dielectric constant proposed in the U.S. Pat. No. 5,029,043 "Chip type LC composite ceramic component", the Japanese Pat. No. 62,147,703 "High permittivity oxide magnetic material" and the U.S. Pat. No. 5,856,770 "Filter with ferroelectric-ferromagnetic composite materials" all need to prepare magnetic material powders and dielectric material powders in advance in the manufacturing process. The magnetic material powders, such as ferrite, are obtained by sintering and grinding magnetic materials. The dielectric material powders, such as Ba/Sr—$TiO_3$, are also obtained by sintering and grinding dielectric materials. These two different powders are then mixed, condensated, shaped, and sintering to obtain a compound material with magnetic and dielectric properties. However, when sintering these two types of powders, BaO and SrO in Ba/Sr—$TiO_3$ will combine with the ferrite to form barium ferrite and strontium Ferrite. These two ferrite are hard magnetic materials with a permeability close to 1. Therefore, the compound materials thus obtained have a very low permeability.

In summary, it is highly desirable to develop a new material with a high permeability and a high dielectric constant and its manufacturing method as well.

SUMMARY OF THE INVENTION

It is an objective of the invention to provide a ferrite with a high permeability and a high dielectric constant. It can not only be used as a magnetic material in an electronic element, e.g. LC-type elements, but also a dielectric material at the same time.

The ferrite with high permeability and dielectric constant disclosed in the specification has the following composition $Ti_x(MFe_2O_{4+2x/y})_y$, where $x+y=1$ and $0<x<1$. Here M is any one or more metals selected from the group of Mn, Ni, Cu, and Zn. Such a combination can form ferrite materials with a permeability between 2 and 2260 and a dielectric constant between 17 and 2775. Since the disclosed ferrite material is a single composite material mixed and formed from raw material powders of $TiO_2$, $Fe_2O_3$ and one or more metal selected from Mn, Ni, Cu or Zn in an appropriate proportion. It does not have a hard magnetic phase as in barium and strontium ferrites and thus have a high permeability and a high dielectric constant. It is particularly useful in elements requiring magnetic and dielectric materials, such as LC-type elements. It also avoids the problems of compatibility and breakdown of finished products due to mixing two different materials.

According to a manufacturing method for ferrites with high permeability and high dielectric constant of the invention, raw material powders of $TiO_2$, oxide of metal M and $Fe_2O_3$ are prepared according to the composition $Ti_x(MFe_2O_{4+2x/y})_y$, and homogeneously mixed, where $x+y=1$ and $0<x<1$. The metal M can be any one or several metals selected from the group of Mn, Ni, Cu, Mg, Li and Zn. The homogeneously mixed material powders are preheated at, for example, 750° C. and ground into tiny powders, which are then compressed and made into needed shapes. Afterwards, a temperature between 840° C. and 1250° C. is used for sintering, forming a ferrite with a high permeability and a high dielectric constant. The ratio between x and y can be adjusted according to practical needs to obtain ferrite materials with different permeabilities and dielectric constants. They are applicable to various types of elements.

BRIEF DESCRIPTION OF THE DRAWINGS

The invention will become more fully understood from the detailed description given hereinbelow illustration only, and thus are not limitative of the present invention, and wherein.

DETAILED DESCRIPTION OF THE INVENTION

Figure 1:
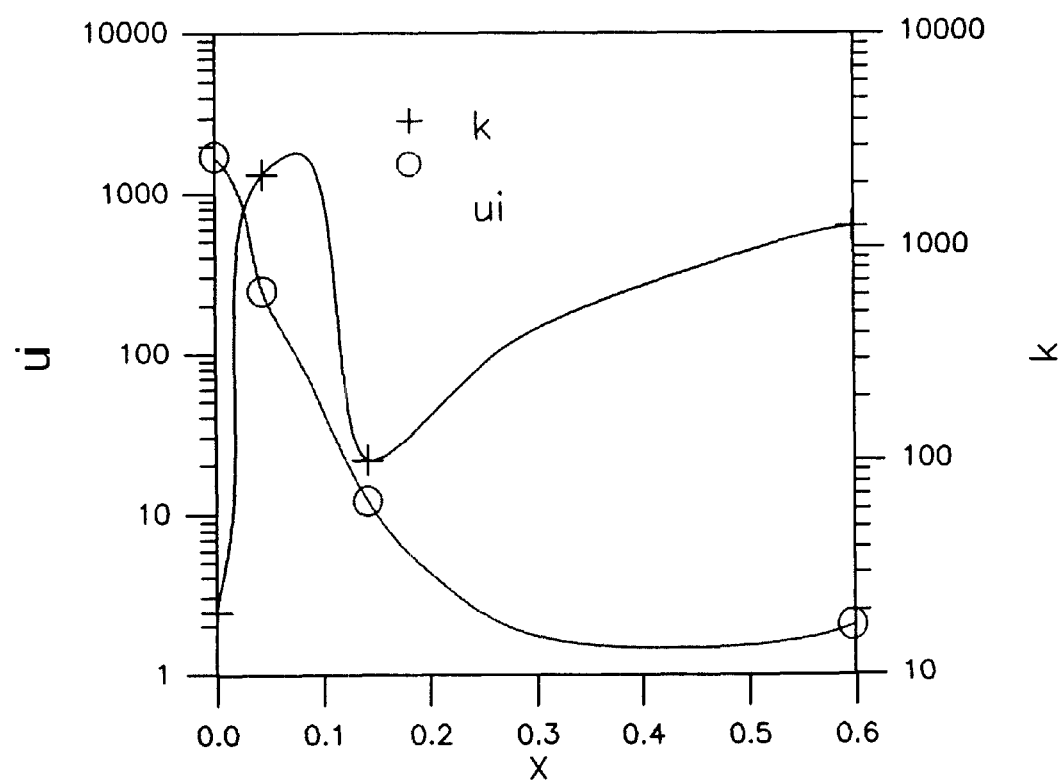
FIG. 1 shows experimental data of the permeability and dielectric constant of a ferrite with both high permeability and high dielectric constant.

The disclosed ferrite with both high permeability and high dielectric constant is discovered from the studies of loss behaviors in soft ferrites. Normal ferrites often have impurity formed at the grain boundaries. The composition and characteristic of the crystal have great influence on losses. Most researchers only notice the resistance of the grain boundary. However, the dielectric property also affects the loss behavior. In need of a low loss, a gain boundary with a low dielectric constant should be formed. After some researches we finds that if we tries the opposite way, not only can a ferrite with a high dielectric constant be obtained, the ferrite also preserves the property of a high permeability. The disclosed ferrite has the composition $Ti_x(MFe_2O_{4+2x/y})_y$, where $x+y=1$ and $0<x<1$. The metal M can be any one or several metals selected from the group of Mn, Ni, Cu, Mg, Li and Zn. Taking a ferrite with M=Ni(12%)+Cu(28%)+Zn(60%) as an example, its composition is then $Ti_x(Ni_{0.12}Cu_{0.28}Zn_{0.6}Fe_2O_{4+2x/y})_y$. The ferrite thus formed has distinct permeability and dielectric constant according to different ratios between x and y. From the experimental data curve shown in FIG. 1, one can see that the permeability ranges between 2 and 2260 and the dielectric constant is between 17 and 2775. The optimal proportion is $0.003 \leq x \leq 0.15$, where the permeability is between 5 and 1300 and the dielectric constant is between 50 and 2775. Therefore, one only needs to find an appropriate proportion between x and y, then a ferrite with a high permeability and a high dielectric constant can be obtained.

Figure 2:
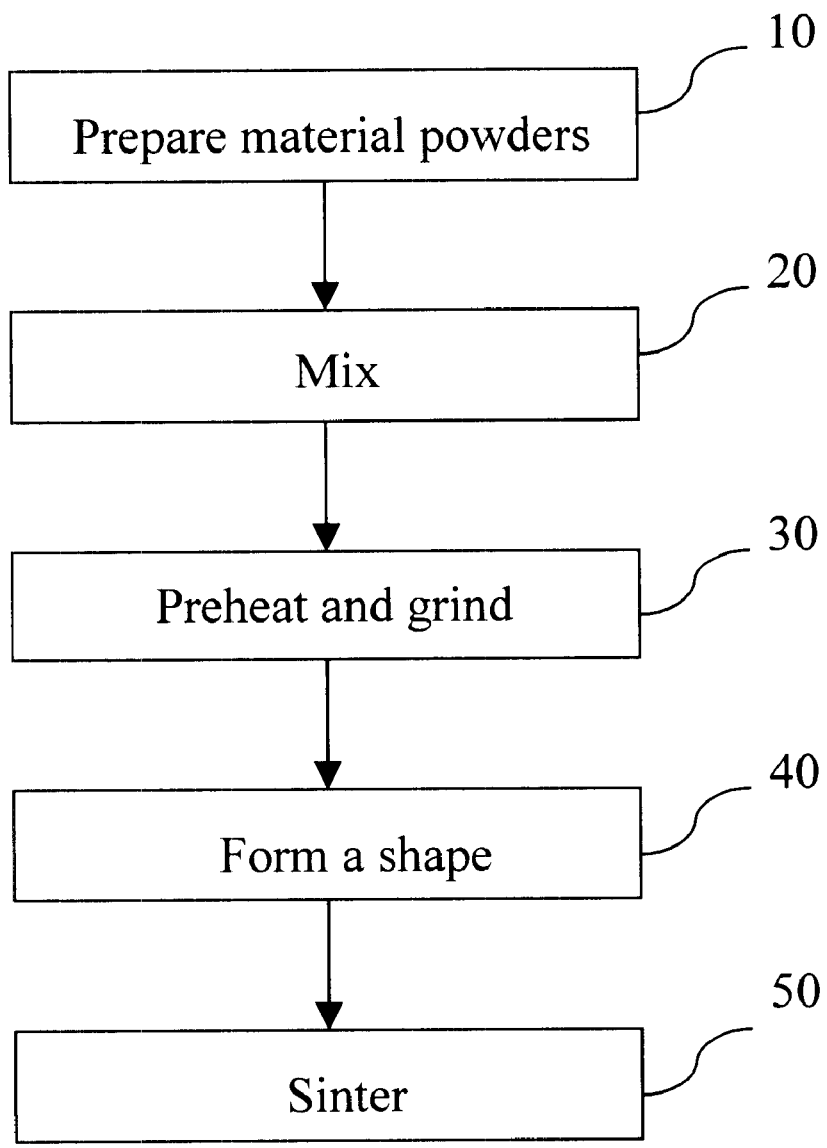
FIG. 2 is a flowchart of making a ferrite with both high permeability and high dielectric constant.

The above-mentioned ferrite can be prepared using the conventional precision ceramic manufacturing process, whose detail is shown in FIG. 2.

First, the raw material powders, such as $TiO_2$, NiO, CuO, ZnO and $Fe_2O_3$, are prepared (step 10) to mix in an appropriate proportion to satisfy the composition formula $Ti_x(MFe_2O_{4+2x/y})_y$, where $x+y=1$ and $0<x<1$. In the current embodiment, M=Ni(12%)+Cu(28%)+Zn(60%). In the mixing step 20, the material powders are thoroughly and homogeneously mixed using dry or water ball mill methods.

Afterwards, preheating and grinding are performed in step 30 to preheat the homogeneously mixed raw material powders at an appropriate temperature. The preheating temperature is between 700° C. and 900° C., e.g. 740° C. After preheating the product is ground into fine powders with a diameter between 0.2 and 1 micrometers using water ball mill. For example, the average diameter of the grains is about 0.5 micrometers.

In the formation step 40, the fine powders are compressed and made into a needed shape. The density of compressed green sheet is, for example, 3.0 g/cm³.

Afterwards, in the sintering step 50 sinters the formed green sheet at an appropriate sintering temperature, which is between 840° C. and 1250° C. A preferred sintering temperature is between 900° C. and 1100° C.

Through the above steps, the disclosed ferrite with a high permeability and a high dielectric constant can be formed. By adjusting the ratio x and y, a ferrite material of desired high permeability and high dielectric constant can be obtained. The material can simultaneously be magnetic material and dielectric material in making an electronic element to avoid the problems due to sintering two different materials in the prior art.

Figure 3:
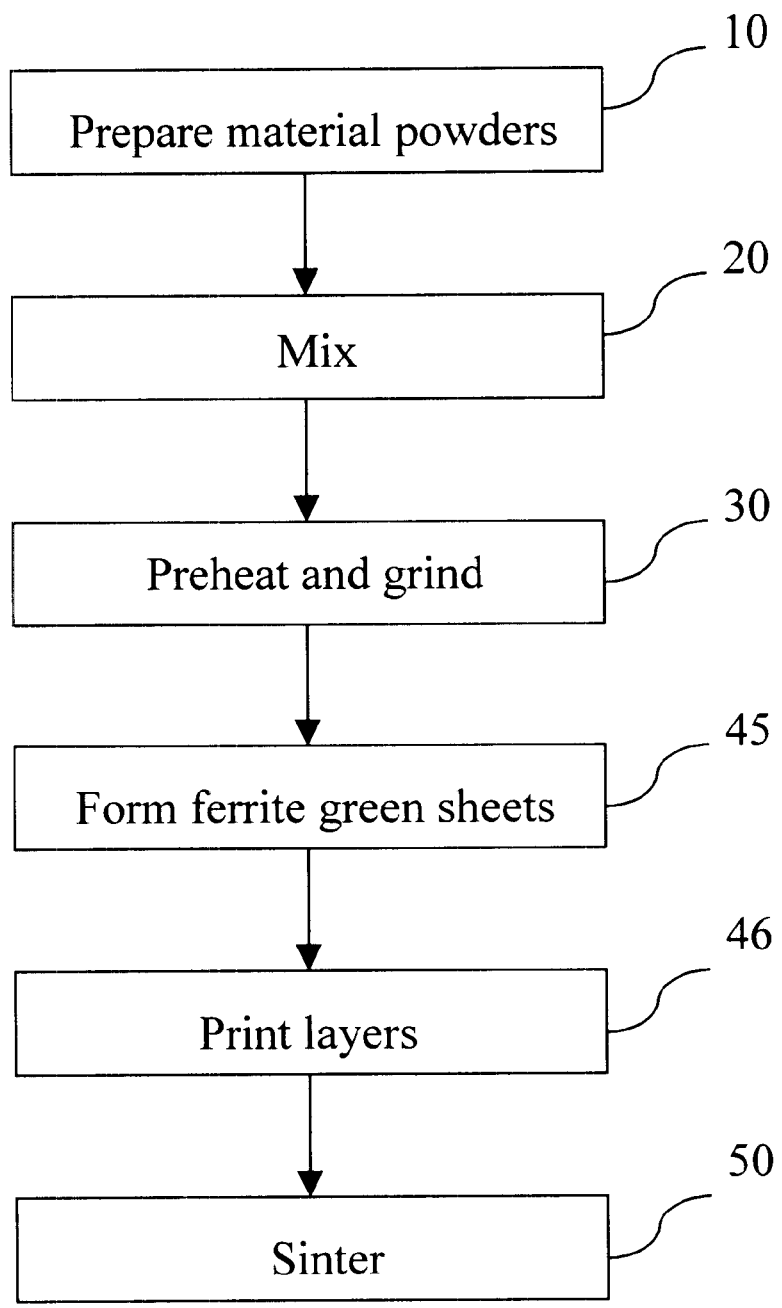
FIG. 3 is a flowchart of using a ferrite with both high permeability and high dielectric constant to make a layered LC element.
Figure 4:
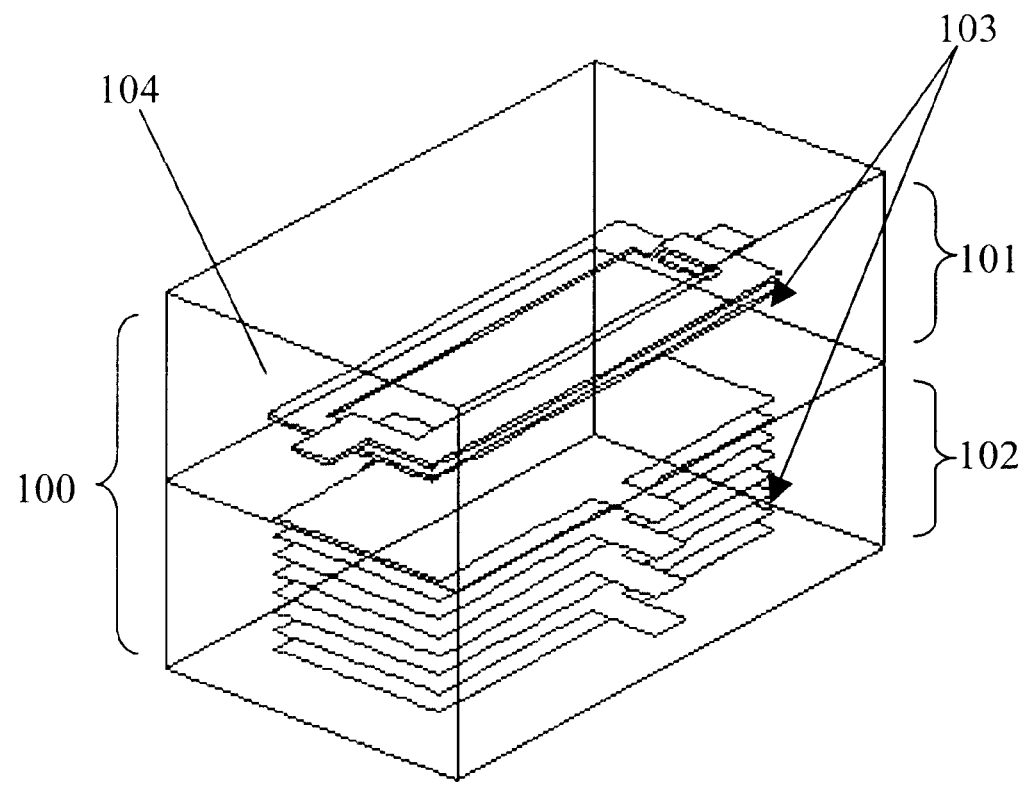
FIG. 4 is a schematic view of the structure of a layered LC element.

FIG. 3 shows the procedure of making an electronic element with both inductor and capacitor elements. The electronic element with both inductor and capacitor elements can be a layered LC element 100 shown in FIG. 4. Following steps 10 through 30 in the above embodiment, one obtains tiny powders with an average diameter of 0.5 micrometers.

After the ferrite green sheet manufacturing step 45, the powders are mixed with adhesive agent into thin green sheets.

In the layer printing step 46, a conductive circuit 103 required by the inductors 101 and capacitors 102 is printed on the green sheet made of the ferrite. Several layers are stacked to form a stacked green sheet.

In the sintering step 50, the green sheet is sintered at an appropriate sintering temperature. The sintering temperature is between 840° C. and 1250° C. and most preferably between 900° C. and 1100° C. This thus makes a single-material LC compound element made of the ferrite 104 with both high permeability and high dielectric constant.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A ferrite which is simultaneously a magnetic material and a dielectric material, the ferrite having a chemical composition of $Ti_x(MFe_2O_{4+2x/y})_y$, where $x+y=1$, $0<x<1$ and M refers to metal(s) selected from the group consisting of Mn, Ni, Cu, Mg, Li and Zn.

2. The ferrite of claim 1, wherein $0.003 \leq x \leq 0.15$, giving a permeability between 5 and 1300 and a dielectric constant between 50 and 2750.

3. A method for fabricating a ferrite which is simultaneously a magnetic material and a dielectric material, the method comprising:

preparing homogeneously mixing material powders of $TiO_2$, oxide of metal M and $Fe_2O_3$ into the composition $Ti_x(MFe_2O_{4+2x/y})_y$, where $x+y=1$, $0<x<1$, and M is selected from the group consisting of Mn, Ni, Cu, Mg, Li and Zn;

preheating the homogeneously mixed material powders and grinding them into powders;

compressing the powders.into a desired shape; and sintering the shaped powders at a temperature between 840° C. and 1250° C.

4. The method of claim 3, wherein x is between 0.003 and 0.15.

5. The method of claim 3, wherein the preheating temperature is between 700° C. and 900° C.

6. The method of claim 4, wherein the diameters of the powders are all under 1 micrometer.

7. The method of claim 4, wherein the average diameter of the powders is 0.5 micrometers.

* * * * *